United States Patent [19]
Yeh

[11] Patent Number: 5,268,578
[45] Date of Patent: Dec. 7, 1993

[54] SHAPE FOR X-RAY DETECTOR

[75] Inventor: Lun-Shu R. Yeh, Berkeley Heights, N.J.

[73] Assignee: North American Philips Corporation, New York, N.Y.

[21] Appl. No.: 918,342

[22] Filed: Jul. 21, 1992

Related U.S. Application Data

[63] Continuation-in-part of Ser. No. 898,772, Jun. 12, 1992.
[51] Int. Cl.$^5$ .............................................. G01T 1/00
[52] U.S. Cl. ............................ 250/370.01; 250/336.1; 250/370.12
[58] Field of Search ........... 250/336.1, 370.01, 370.09, 250/370.11, 370.12, 370.14

[56] References Cited

U.S. PATENT DOCUMENTS

| | | | |
|---|---|---|---|
| 2,853,621 | 9/1958 | Ruderman | 250/370.11 |
| 4,931,650 | 6/1990 | Lowe et al. | 250/397 |

FOREIGN PATENT DOCUMENTS 2222660 10/1974 France .......................... 250/370.01

OTHER PUBLICATIONS

Harvey et al., "The Transverse-Field Silicon Detector", IEEE Trans. Nuclear Sci., 5, vol. N5-17, Mar. 1970, pp. 306-309.

Dodge et al., "A Scattering Chamber for Use with Cooled Large Area Lithium Compensated Silicon Radiation Detectors", Nuc. Ins. & Met., 42, 1966, pp. 181-187.

F. S. Goulding et al., "Detector Background and Sensitivity of Semiconductor X-ray Fluorescence Spectrometers", Advances in X-rays Analysis, vol. 15, 1972, pp. 470-482.

F. S. Goulding et al., "Photon-Excited Energy-Dispersive X-ray Fluorescence Analysis for Trace Elements", Annual Review of Nuclear Science, vol. 23, 1973 pp. 45-74.

N. W. Madden et al., "An Improved Operating Mode for a Si(Li) X-ray Spectromet" IEEE Transactions on Nuclear Science, vol. 37, No. 2, Apr. 1990, pp. 171-176.

Primary Examiner—Constantine Hannaher
Assistant Examiner—Edward J. Glick
Attorney, Agent, or Firm—Anne E. Barschall

[57] ABSTRACT

A silicon lithium x-ray detector has a new shape. The shape includes a front and a back. At the back, a center portion of thickness H is surrounded by a groove of depth D and an outer rim having a height h less than H.

7 Claims, 1 Drawing Sheet

SHAPE FOR X-RAY DETECTOR

RELATED APPLICATIONS

The present application is a continuation-in-part of U.S. application Ser. No. 07/898,772, filed Jun. 12, 1992 which is incorporated herein by reference.

BACKGROUND OF THE INVENTION

1. Field of the Invention

The invention relates to lithium-drifted silicon Si(Li) x-ray detectors, and in particular to the shape of such detectors.

2. Related Art

X-ray detectors of this type traditionally have two shapes.

The first prior art shape is depicted in FIG. 1. FIG. 1 is a cross-section. The detector is rotationally symmetric about an axis A-B shown in the figure and is made of the well-known material, lithium-drifted silicon. X-rays incident on front surface 103 are converted to an electric current by the detector held under voltage bias. Current is drawn off the detector from back surface 104 into a detector assembly for amplification and further processing.

The shape of this traditional detector is known as a "top hat structure" because of its resemblance to a historical nineteenth century hat. This structure has the advantage of being relatively cheap to manufacture.

A second prior art shape is depicted in FIG. 2. This shape is also rotationally symmetric about the axis A-B. The shape is a cylinder characterized by a groove 201 running concentrically about the axis A-B. This structure is referred to herein as the "deep-grooved structure".

The deep-grooved structure has several advantages over the top hat structure. The high outer rim 203 protects the inner side surface 202 from mechanical damage due to handling. The groove 201 reduces the mass of the detector, improving energy resolution.

The center portion of both structures is the lithium compensated active area of the detector. Diffusion of lithium from this area occurs readily at room temperature. The groove 201 inhibits diffusion of lithium from the central portion 210 of the detector to the outer portion, increasing service life.

In addition, conductive contaminants are less likely to be deposited in the groove 201 than on other surfaces of the detector. The resultant gap in conductive contaminants reduces current leakage between the front 103 and back 104 surfaces of the detector during operation, when a voltage difference is maintained between these surfaces.

The deep-grooved structure has several disadvantages.

It has significantly higher manufacturing costs than the top hat structure. Handling is difficult when the inner side surface 202 is the same height as the outer rim 203. Moreover, chemical etching and polishing of all surfaces except the back surface 104 is often necessary to correct mechanical damage due to handling. The narrowness of the groove 201, normally between 0.5 and 0.7 mm, makes the etch rate at the bottom of the groove 201 difficult to control. This results in low production yield.

Furthermore, in normal operation, surfaces 100, 101, 102, 202 and 203 and the groove 201 are protected with a passive layer. Since the detector is costly, when a detector fails to meet requirements during production or in normal use, the failed detector may be reprocessed chemically to put on a new passive layer. All surface must be cleaned to remove the passive layer before reprocessing to prevent cross-contamination which would make production yield even lower. Extensive labor is required to clean groove 201, no matter what cleaning process is used.

It has also been known to make a detector which is not rotationally symmetric, where necessary to fit into available space. Such detectors traditionally have the appearance of the top-hat or deep-grooved structure with a piece cut off, typically beyond some plane parallel to the axis A-B.

Prior art detectors are known particularly from F. S. Goulding et al., "Detector Background and Sensitivity of Semiconductor X-ray Fluorescence Spectrometers", Advances in X-ray Analysis, Vol. 15, 1972, pp. 470–482. General background information about x-ray detectors can be found in publications such as F. S. Goulding and J. M. Jaklevic, "Photon-excited Energy-dispersive X-ray Fluorescence Analysis for Trace Elements", Annual Review of Nuclear Science, Vol. 23, 1973, pp. 45–74; N. W. Madden, et al., "An Improved Operating Mode for a Si(Li) X-ray Spectrometer", IEEE Transactions on Nuclear Science, Vol. 37, 1990, pp.171–176; and U.S. Pat. No. 4,931,650.

SUMMARY OF THE INVENTION

It is an object of the invention to improve the detector shape to retain advantages of both traditional structures.

The object of the invention is achieved by reducing the height of the exterior wall of the deep-grooved structure.

BRIEF DESCRIPTION OF THE DRAWING

The invention will now be described by way of non-limitative example with reference to the following drawings.

DETAILED DESCRIPTION OF THE PREFERRED EMBODIMENTS

Figure 1:
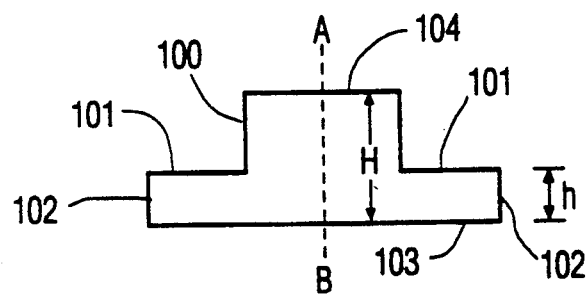
FIG. 1 is a cross section of a prior art x-ray detector.
Figure 2:
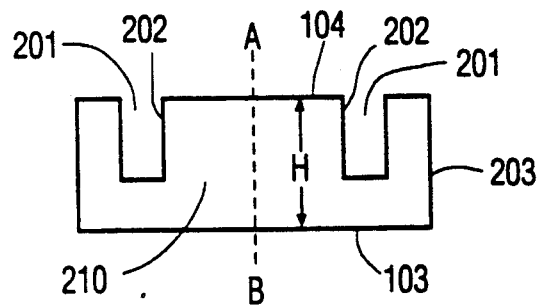
FIG. 2 is a cross section of a second prior art x-ray detector.
Figure 3:
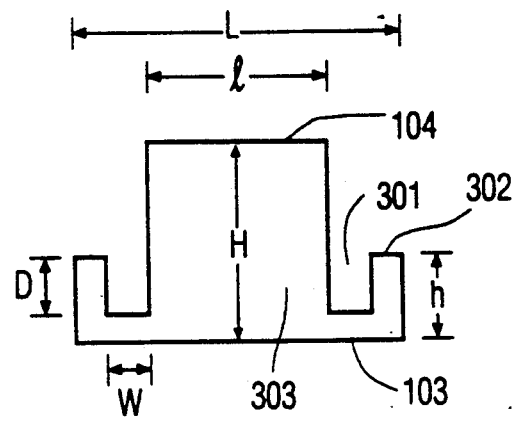
FIG. 3 is a cross section of an x-ray detector according to the invention.

FIG. 3 is a cross section of the x-ray detector according to the invention. The x-ray detector is similar to the deep-grooved structure in having a groove 301 concentric about the axis of symmetry of the detector; however the height h of the outer rim 302 is reduced in comparison with the thickness H of the main body of the detector 303.

This reduction of h gives several advantages. First, since the groove 301 is less deep than in the deep-grooved structure, more effective control of chemical etching inside the groove is possible. This results in a lesser part rejection rate. Second, the mass of the detector can be reduced in comparison to both the top hat and deep-grooved structures since h is the same as the height of the outer rim in the top hat structure. The reduction in mass results in improved energy resolution over both conventional structures. The improvement in energy resolution is normally about 3eV over both the top hat and the deep-grooved structures. This improvement is noted when resolution is measured at 5.90 keV of manganese x-ray using an iron-55 source.

Like the deep-grooved structure, the new structure reduces lithium diffusion when compared with the top-hat structure. The new structure is also comparable to the deep-grooved structure in reducing current leakage.

Depending on the application of the x-ray detector, the thickness H of the detector may vary, typically between 3 mm and 5 mm. This thickness is the same on all three types of detector. The height h of the outer rim 302 can be as short as 1.10 mm, or about 30% of the thickness H of the detector. For a thicker detector, ratios of h/H of up to 60% have been found workable. The depth D of the groove 301 may depend on the height h. The ratio D/h may range from 40% to 85%. For a thick detector with a high rim, h, this D/h ratio should tend to be higher than for a thin detector with a low rim. When h is between 1.5 mm and 1.8 mm, D/h is preferably between 45% and 65%. The width W of the groove 301 can vary between 0.4 mm and 1.0 mm; and preferably between 0.50 and 0.70 mm.

The diameter l determines the lithium compensated active area at the front surface 103. For the most common detectors, which have a front active surface area of 10 mm$^2$, l is preferably between 3.6 mm and 3.8 mm. For larger detectors, the diameter l and the overall diameter L will increase proportionately; however, all other parameters, such as D, W, and h may remain the same as for smaller detectors or change slightly for ease of handling. The lithium compensated active area may have a surface area up to 30 mm$^2$.

I claim:

1. A silicon lithium x-ray detector having a body including a lithium compensated active area and a rim portion at least partially surrounding the lithium compensated active area, the body defining a groove between said lithium compensated active area and said rim, wherein a height h of the rim portion is less than a thickness H of said lithium compensated active area 2. The x-ray detector of claim 1 wherein h has a value in the range from 30% to 60% of H.

3. The x-ray detector of claim 1 wherein the groove has a depth D and D has a value in the range from 40% to 85% of h.

4. The x-ray detector of claim 3 wherein h has a value in the range from 1.5 mm to 1.8 mm and D has a value in the range from 45% to 65% of h.

5. The x-ray detector of claim 1 wherein the groove has a width W which has a value in the range from 0.4 mm to 1.0 mm.

6. The x-ray detector of claim 4 wherein the value of W is in the range from 0.50 mm to 0.70 mm.

7. The x-ray detector of claim 1 wherein the lithium compensated active area has a surface area in the range from 10 mm$^2$ to 30 mm$^2$.

* * * * *